(12) United States Patent
Williams et al.

(10) Patent No.: US 6,174,826 B1
(45) Date of Patent: Jan. 16, 2001

(54) WET-LAID NONWOVEN POLYOLEFIN BATTERY SEPARATOR SUBSTRATE

(75) Inventors: Richard C. Williams, Erie; James A. Goettmann; Gerald L. Funk, both of North East, all of PA (US); Linda M. Gee, Brookline, MA (US)

(73) Assignee: BBA Nonwovens Simpsonville, Inc., Simpsonville, SC (US)

( * ) Notice: Under 35 U.S.C. 154(b), the term of this patent shall be extended for 0 days.

(21) Appl. No.: 08/837,280

(22) Filed: Apr. 11, 1997

Related U.S. Application Data

(63) Continuation-in-part of application No. 08/801,774, filed on Feb. 14, 1997, now Pat. No. 5,935,884.

(51) Int. Cl.[7] .............................. B32B 5/02; B32B 27/34
(52) U.S. Cl. .................. 442/364; 442/357; 442/398; 442/409; 442/414; 162/146; 162/157.2
(58) Field of Search ...................... 442/364, 357, 442/398, 409, 414; 162/157.2, 146

(56) References Cited

U.S. PATENT DOCUMENTS

| | | | |
|---|---|---|---|
| 3,615,865 | 10/1971 | Wetherell | 429/254 |
| 3,773,590 | 11/1973 | Morgan | 156/244.25 |
| 3,907,604 | 9/1975 | Prentice | 429/254 |
| 3,947,537 | 3/1976 | Buntin et al. | 264/137 |
| 3,985,580 | 10/1976 | Cogliano | 264/121 |
| 4,110,143 | 8/1978 | Cogliano et al. | 156/167 |
| 4,205,122 | 5/1980 | Miura et al. | 429/144 |
| 4,216,281 | 8/1980 | O'Rell et al. | 429/252 |
| 4,264,961 | 4/1981 | O'Rell et al. | 429/250 |
| 4,265,985 | 5/1981 | O'Rell et al. | 429/225 |
| 4,330,602 | 5/1982 | O'Rell et al. | 429/206 |
| 4,430,398 | 2/1984 | Kujas | 429/206 |
| 4,987,024 | 1/1991 | Greenberg et al. | 428/219 |
| 5,075,990 | 12/1991 | Greenberg et al. | 38/44 |
| 5,180,647 | 1/1993 | Rowland et al. | 429/252 |
| 5,298,348 | 3/1994 | Kung | 429/101 |
| 5,389,471 | 2/1995 | Kung | 429/206 |
| 5,436,094 | 7/1995 | Horimoto et al. | 429/254 |
| 5,589,302 | 12/1996 | Degen et al. | 429/250 |
| 5,645,956 | 7/1997 | Degen et al. | 429/142 |

*Primary Examiner*—Terrel Morris
*Assistant Examiner*—John J. Guarriello
(74) *Attorney, Agent, or Firm*—Ostrager Chong & Flaherty LLP

(57) ABSTRACT

A nonwoven composite web suitable for use, after post-treatment with a wetting agent, as a battery separator is formed by a wet process on a papermaking machine. One nonwoven composite material is made from a furnish of polyolefin binder fibers and polyolefin staple fibers. The web coming off the papermaking machine is dried using infra-red dryers followed by heated dryer cans. After drying, the web is thermally bonded using heated calendar rolls. The polyolefin binder fibers melt as the web passes through the calendar rolls and thermally bond the polyolefin staple fibers of the web when the melted binder fiber material fuses upon cooling.

6 Claims, 3 Drawing Sheets

WET-LAID NONWOVEN POLYOLEFIN BATTERY SEPARATOR SUBSTRATE

RELATED PATENT APPLICATION

This application is a continuation-in-part application of U.S. patent application Ser. No. 08/801,774, U.S. Pat. No. 5,935,884 filed on Feb. 14, 1997.

FIELD OF THE INVENTION

This invention generally relates to synthetic nonwoven materials fabricated by wet-laid processes. In particular, the invention relates to a paper-like web made with polyolefin fibers which is useful, after post-treatment with a wetting agent, as a battery separator.

BACKGROUND OF THE INVENTION

Nickel-cadmium batteries generally consist of a wound anode interleaved with a wound cathode, the wound anode and cathode being spaced apart at regular intervals in an electrolyte. The interval between the anode and cathode may be as small as 0.05 mm. Although it is desirable to place the cathode and anode close together to increase the load capacity of the battery, the electrodes must not touch to avoid producing a short circuit. To accomplish this end, separators made of suitable material are arranged between the anode and cathode to keep them apart. The separator material must be inert to the electrolyte and to the reactions occurring at the surfaces of the electrodes.

In addition, the separator material should be sufficiently elastic to conform to the shape of the electrode surfaces. Also the separator material should be sufficiently porous to allow unimpeded migration of ions between the electrodes, yet be able to filter out solid particles which separate from the electrodes and attempt to pass through the separator. The separator material further must be wettable by the liquid electrolyte to prevent the establishment of dry areas on the separator fabric. Finally, the separator should have the capacity to adsorb and store the liquid electrolyte.

Separator material made from woven fabric is disadvantageous because fabric stores insufficient quantities of the liquid electrolyte. Furthermore, because pores formed between the warp and weft of the fabric are large, solid particles which dislodge from the electrodes can pass through the fabric. Such particles accrete until a bridge is formed between an anode and cathode, giving rise to a short circuit in the battery.

It is known in the prior art that the foregoing disadvantages can be overcome by providing a battery separator material made from nonwoven polypropylene fabric.

U.S. Pat. No. 3,615,865 to Wetherell discloses a battery separator comprising a nonwoven mat of polypropylene fibers bonded with polyacrylic acid. In lieu of polypropylene fibers, polyethylene or polyamide fibers may be used.

U.S. Pat. No. 4,205,122 to Miura et al. discloses a method for manufacturing a battery separator material by subjecting an aqueous dispersion of olefinic resin fibers to a sheet-forming operation; drying the resulting wet nonwoven mat; and heat-treating the dried mat to form a self-supporting nonwoven mat. The drying and heat treatment of the nonwoven mat can be performed by passing it through a hot air dryer or "by means of dryers used in conventional papermaking machines, such as a Yankee dryer". After heat treatment, the mat is preferably calendared to increase the surface smoothness.

U.S. Pat. No. 4,216,281 to O'Rell et al. discloses a battery separator comprising 30–70% polyolefin synthetic pulp, 15–65% siliceous filler and 1–35% by weight of long fibers made of polyester or glass. Cellulose may be included in an amount up to 10%. The battery separator material is formed using standard papermaking equipment. The papermaking equipment disclosed in the O'Rell '281 patent comprises a pulper, a chest, a head box and a rotoformer drum which rotates in the head box to pick up slurry and form a web. The web is removed from the rotoformer drum and passed over a felt. The web is pressed by calendars. The calendared web is fed to an oven and then onto a series of heated cans. The cans feed to a windup station. In Example 1, the steam cans were operated at surface temperatures of about 270° F. The steam cans both dried the web and increased fiber bonding.

U.S. Pat. No. 4,430,398 to Kujas discloses a battery separator comprising a nonwoven mat of polypropylene fibers. In the Example, 4-denier polypropylene fibers were used.

U.S. Pat. No. 4,987,024 to Greenberg et al. discloses a battery separator comprising a fibrous web having 90% bicomponent polypropylene/polyethylene 0.9-denier, 38-mm-long fiber and 10% polypropylene 1.5-denier, 38-mm-long fiber (see Example II). The nonwoven web is produced on web-forming equipment "such as cards, air formed, melt blowing, continuous filament or even wet-lay equipment". In accordance with the method of Greenberg, the web is passed through the nip of two steel rolls that are heated and have pressure applied to them. The heated rolls sear the top and bottom surfaces of the web to produce film-like surfaces.

U.S. Pat. No. 5,180,647 to Rowland et al. discloses a battery separator comprising a fibrous mat which is filled with a mixture of very fine mineral powder (e.g., silicon material) and a binder resin (e.g., latex). Rowland discloses that the mat can be a wet-laid polypropylene nonwoven material. However, the only examples given in Rowland are spunbonded webs made from polyester fibers.

U.S. Pat. No. 5,298,348 to Kung discloses a battery separator for nickel/metal hydride batteries. The battery separator is formed from 10–20 wt. % polyolefin pulp, one or more non-water-swellable fibers and at least one water-swellable polyvinyl alcohol fiber. The separator is impregnated with 1 wt. % or less acrylic resin binder. The length of the polyolefin pulp is about 1 to 4 mm. The non-water-swellable fibers may be polyester, polyacrylic, polyamide, polyolefin, bicomponent fibers and mixtures thereof. The preferred bicomponent fiber is a fiber which has a polyethylene sheath and a polypropylene core. The sheet is formed on conventional papermaking machinery, such as a rotoformer or Fourdrinier paper machine. The web is dried in an oven and/or by one or more drying cans. The dried web may be calendared.

U.S. Pat. No. 5,436,094 to Horimoto et al. discloses a bulky synthetic pulp sheet useful as a separator for sealed lead batteries. The pulp sheet contains 5–95 wt. % of a synthetic pulp and 5–50 wt. % of a polymer binder. The sheet is made by subjecting a mixture of synthetic pulp and fibrous binder to wet-laid sheet-making followed by a heat treatment. The pulp can consist of polyethylene, polypropylene, polyester, nylon or other polymers. The binder may take the form of synthetic pulps, synthetic fibers, sheath-core type composite fibers, resin powders and emulsions. The type of binder selected is dependent on which kind of synthetic pulp is used as the chief material.

SUMMARY OF THE INVENTION

The present invention is a nonwoven polyolefin battery separator substrate which is formed by a wet process on a papermaking machine. Dispersion of the polyolefin fibers is enhanced by the addition of formation aids, such as surfactants, to the fiber slurry.

The web coming off the papermaking machine is partially dried using infra-red dryers and is then completely dried in a dryer can section. Specific dryer can temperatures are needed to facilitate drying and partial bonding of the binder fiber and also to prevent the fabric from sticking to the cans. The partially bonded fabric is thereafter thermally bonded on a calendar stack, which squeezes and bonds the material.

The foregoing wet-laid product yields a more uniform web having increased pore size as compared to the dry-laid product. The overall formation of a wet-laid product is greatly improved over existing dry-laid grades. Coverage of the fiber across the web is more random and not directional as in a dry-laid product. A more uniform web improves potassium hydroxide absorption in a nickel-cadmium battery. Because of this improved absorption, the life of the battery is extended, i.e., the number of battery recharges is increased in nickel-cadmium and nickel/metal hydride batteries.

This invention also has the benefit of eliminating the manufacturing costs associated with dry web formation. The component fibers are combined with water into a homogeneous mixture and formed into a mat employing a wet-lay process. A high strength paper-like material is formed by thermally bonding the mat under controlled temperature and pressure conditions.

The nonwoven battery separator material in accordance with a first preferred embodiment of the invention is a composite material comprising 30–70 wt. % polypropylene staple fibers and 30–70 wt. % polyethylene/polypropylene sheath/core bicomponent fibers. The most preferred embodiment comprises 50 wt. % polypropylene staple fibers and 50 wt. % polyethylene/polypropylene sheath/core bicomponent binder fibers.

In accordance with a second preferred embodiment of the invention, the wet-laid nonwoven separator material can be formed from 10–97 wt. % polypropylene fibers having a polyvinyl alcohol surface, with the remainder being polypropylene staple fibers or polyethylene/polypropylene bicomponent fibers or polyvinyl alcohol fibers or blends thereof. In accordance with this second preferred embodiment, the amount of polyvinyl alcohol fibers in the furnish should not exceed 10 wt. %.

In accordance with the method of manufacture of the invention, the polyolefin fibers are dispersed in water with the aid of a wetting agent, i.e., a surfactant. The surfactant is added to the hydropulper. The material is then run on an inclined or flat wire Fourdrinier machine. The wet-laid material is partially dried using infra-red dryers and then completely dried in a dryer can section. The temperature of the dryer cans is below the melting temperature of the polypropylene staple fibers and the polypropylene core material, but provides melting of the polyethylene sheath material to produce partial bonding of the material.

The dried and partially bonded material is wound and transported to a calendaring station, where heated calendaring rolls produce complete bonding and the desired caliper. Calendaring is performed on a four-steel-roll stack. Alternatively, the rolls can be cotton filled or Teflon coated to improve fiber tie-down. Before the calendared material can be used to construct a battery separator, the calendared material must treated with an agent to increase wettability of the substrate.

DETAILED DESCRIPTION OF THE PREFERRED EMBODIMENTS

Figure 1:
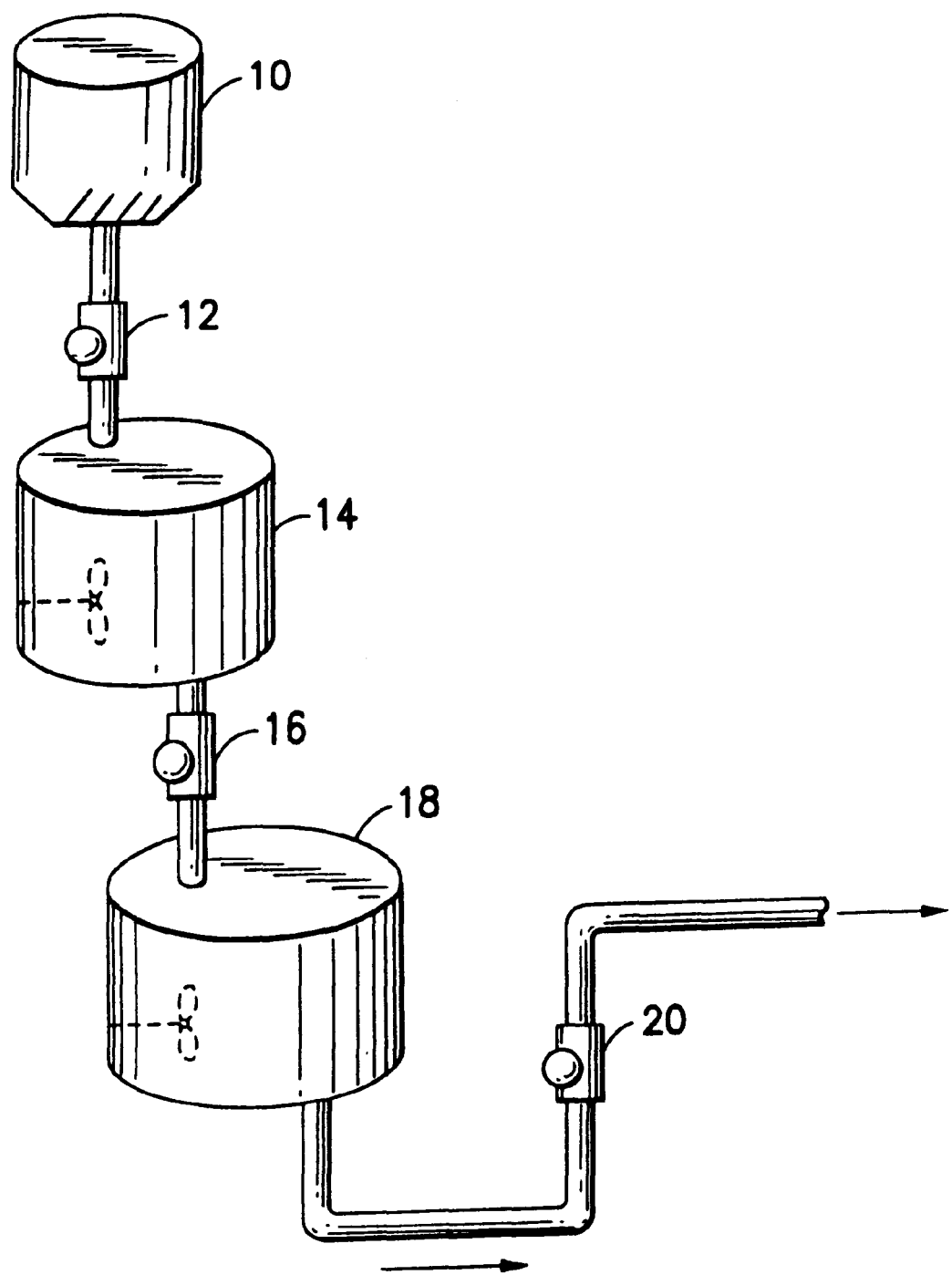
FIG. 1 is a diagrammatic view of an apparatus for preparation of stock or furnish for manufacture of the composite material of the invention.

In accordance with a first preferred embodiment of the invention, the fiber furnish comprises 30 to 70 wt. % of polyolefin staple fibers and 70 to 30 wt. % polyolefin binder fibers. The preferred staple fiber is polypropylene staple fiber; the preferred binder fiber is polyethylene/polypropylene sheath/core bicomponent fibers.

In accordance with a most preferred embodiment of the invention, the fiber furnish comprises 50 wt. % polypropylene staple fibers (2.2 dpf×10 mm) and 50 wt. % polyethylene/polypropylene sheath/core bicomponent fibers (1.5 dpf×¾"). Polypropylene staple fibers having 2.2 dpf and a length of 10 mm are available commercially from Hercules Inc. under the trade designation Type 153. Polyethylene/polypropylene sheath/core bicomponent fibers having 1.5 dpf and a length of ¾" are available commercially from Hercules Inc. under the trade designation Type 440. The Type 440 fibers comprise 50 wt. % polyethylene sheath and 50 wt. % polypropylene core. The polyethylene sheath material of Type 440 bicomponent fibers contains $TiO_2$ and melts at a temperature of about 226.4° F., enabling preliminary bonding of the web in the steam-heated dryer section. In contrast, the polypropylene core material melts at a temperature of about 318° F.

In accordance with a second preferred embodiment of the invention, the fiber furnish comprises 10 to 97 wt. % of WESC fibers with the remainder being polypropylene staple fibers or polyethylene/polypropylene bicomponent fibers or polyvinyl alcohol fibers or blends thereof. The WESC fibers are polypropylene fibers having a polyvinyl alcohol surface which dissolves in water and re-solidifies during drying to fuse the polypropylene fibers. In accordance with the second preferred embodiment, the amount of polyvinyl alcohol fibers in the furnish should not exceed 10 wt. %.

A nonwoven polyolefin battery separator material in accordance with the invention is formed by a wet-laying process on a conventional papermaking machine. Then the wet-laid nonwoven material is thermally bonded under controlled temperature and pressure conditions. In accordance with the method of the invention, a wet-laid mat of the composite material is dried at temperatures in the range of 250–275° F. and then thermally calendared with rolls heated to temperatures in the range of 218–245° F. and nip pressures of 400–900 pli. The weight per unit area of the composite following calendaring can be varied from 60 to 85 gm/m² depending on the sheet composition and the calendaring conditions chosen to effect a certain set of physical properties. Polyolefin staple fibers of 0.2 to 3.0 denier can be used and blended in various ratios to effect desired physical properties.

FIG. 1 illustrates an apparatus for preparation of stock or furnish for manufacture of the composite in accordance with the preferred embodiment. A batch of polyolefin fibers is prepared in a hydropulper 10, which contains water. In preparation of the slurry, the water is agitated, surfactant is added, and the polyolefin fibers are introduced into the furnish in the following sequence: (1) 2.2 dpf×10 mm polypropylene staple fibers; and (2) 1.5 dpf×¾" polyethylene/polypropylene sheath/core bicomponent fibers.

After all of the fibers have been added to the furnish, the furnish is mixed for approximately 2 to 5 minutes to disperse the polyolefin fibers. A web formation aid is added to the furnish. The preferred formation aid is F-108 surfactant, which is a polyoxypropylene-polyoxyethylene block copolymer. F-108 surfactant is commercially available from BASF Corporation and is added at the hydropulper at 10 pounds per 2,000 gallons of water. Other surfactants, such as T-908 and X-114 supplied by BASF, could be used in place of or in conjunction with F-108 surfactant. Thereafter the slurry is mixed for a sufficient time to disperse the polyolefin fibers in a uniform fashion. Visual inspection is used to determine when the fibers are totally separated and well dispersed.

The volume of water and amount of fiber is such that the consistency of the furnish in the hydropulper 10 is about 3.5% solids. After the fibers have been dispersed in a uniform fashion, the fiber slurry is transported to mixing chest 14 via valve 12. In mixing chest 14 the polyolefin fiber slurry is diluted to the desired consistency, i.e., approximately 0.6% solids, by adding water until the slurry is diluted to 12,000 gallons. After the fiber slurry has been suitably mixed in mixing chest 14, the slurry is transported via opened valve 16 to the machine chest 18, where the slurry consistency is maintained at approximately 0.6% solids. Thereafter, the slurry is transported to the web-forming machine via valve 20.

Figure 2:
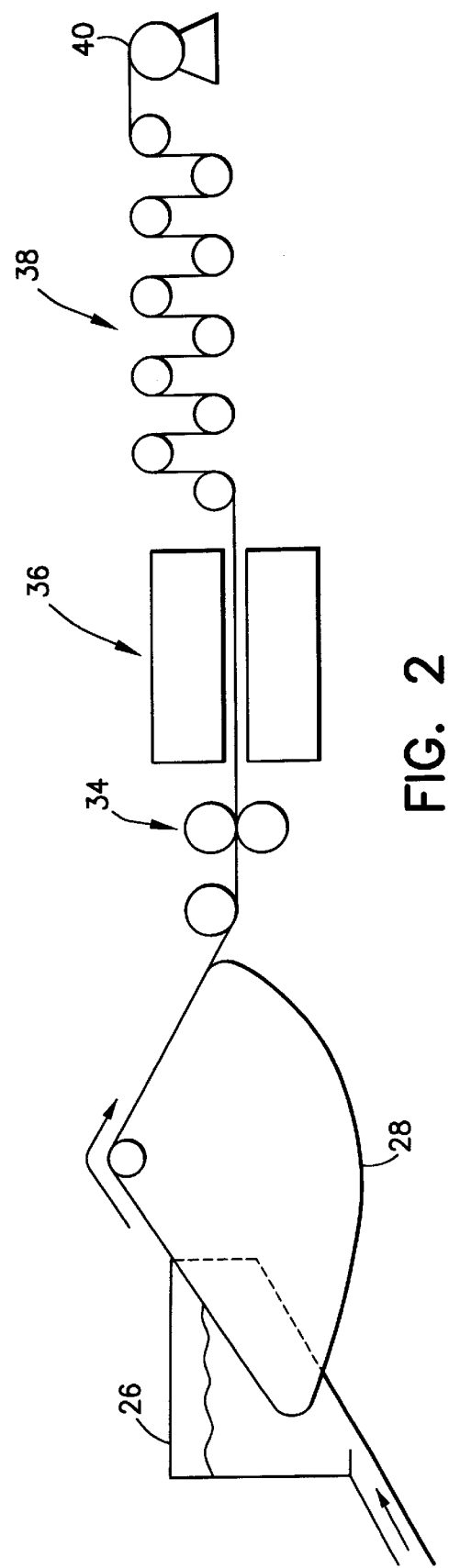
FIG. 2 is a diagrammatic view of an apparatus for formation and drying of a web employed in the manufacture of the composite material.

FIG. 2 is a diagrammatic view of an apparatus for formation and drying of a web employed in the manufacture of the composite in accordance with the invention. The homogeneous fiber slurry is received by headbox 26. In the headbox, the slurry has a consistency of about 0.1% solids. A web 32 is formed by machine 28 using a wet-lay process in accordance with conventional paper-making techniques. Preferably machine 28 is an inclined wire Fourdrinier machine. Alternatively, a Rotoformer, a cylinder or a flat wire Fourdrinier machine can be used. The temperature which the fibers are exposed to on the inclined wire Fourdrinier machine lies in the range of 70–85° F. Thereafter, the web 32 passes through a pair of wet press rolls 34, which remove excess water from the web. The web then enters an infra-red dryer 36. After preliminary drying in the infra-red dryer section, the web enters a dryer can section 38 comprising a stack of dryer cans. The temperatures of the dryer cans should lie in the range 250–275° F. The foregoing specific temperatures are selected to facilitate drying and partial bonding of the binder fiber and also to prevent sticking to the cans. As the web is passed over the dryer cans, the polyethylene sheath material softens and melt, whereby partial bonding of the polypropylene fibers is achieved. The dried web 32 is then wound up on a reel 40 for further processing.

Figure 3:
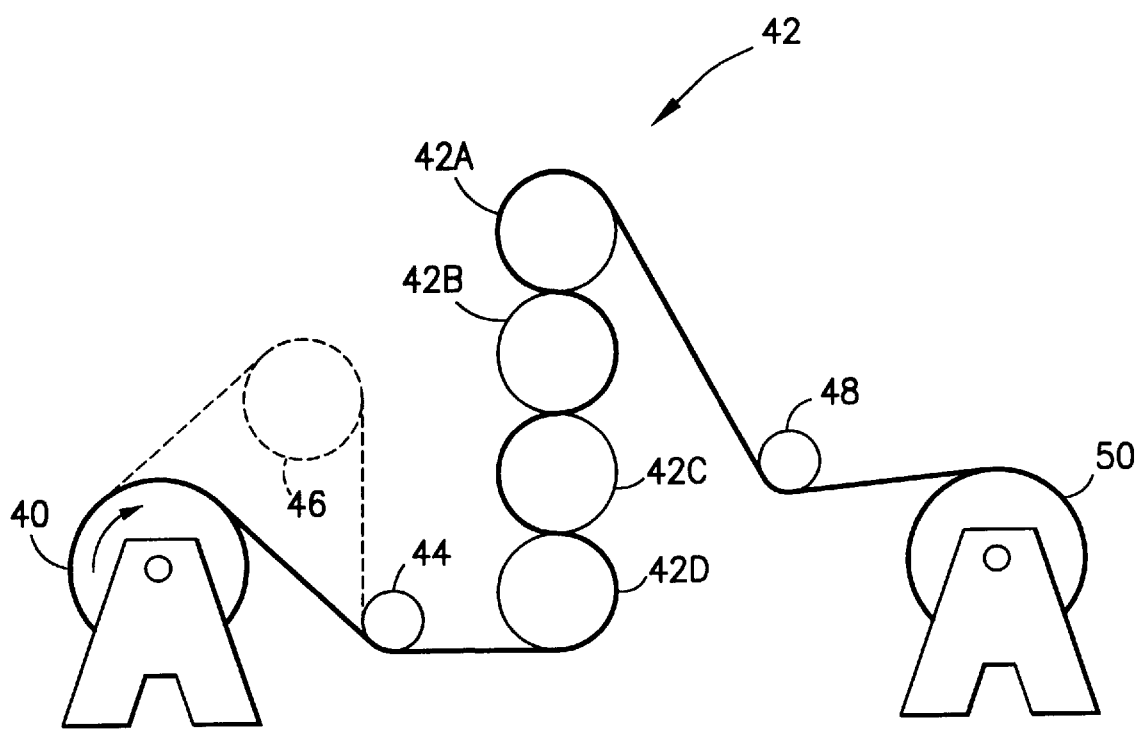
FIG. 3 is a diagrammatic view of an apparatus for calendaring the web to form the composite material of the invention.

A high-strength and densified composite material is provided by thermally bonding, i.e., calendaring, the dried web 32 in a calendar stack 42, as shown in FIG. 3. On the process line, the web 32 is unwound from the reel 40; fed by guide roll 44 to the nip between calendar rolls 42C and 42D; partially wrapped around roll 42C and passed through the nip between rolls 42B and 42C; partially wrapped around roll 42B and passed through the nip between rolls 42A and 42B; and then fed by guide roll 48 to reel 50 on which the web is wound. Calendar rolls 42A–42D, which are preferably fabricated of steel, are heated to a temperature and maintained at a compression pressure in the range of 218–245° F. and of 400–900 pli. In particular, steel roll 42A has a temperature of 218° F.; steel roll 42B has a temperature of 224° F.; steel roll 42C has a temperature of 244° F.; and steel roll 42D has a temperature of 245° F. Thickness values ranging from 5 to 10 mils and air permeability values ranging from 25 to 200 cfm were obtained by calendaring with the rolls having the temperature range of 218–245° F. In the alternative, the rolls could be cotton filled or Teflon coated to improve fiber tie-down.

Optionally, the web can be partially wrapped around a roll 46 (shown by dashed lines in FIG. 3) which is heated to a temperature of about 200–300° F. and then passed between the calendar rolls. The heated roll 46 preheats the web before it enters the calendaring roll nip. Preheating allows a faster speed of the production line.

Table 1 sets forth physical properties of the preferred embodiment having 50 wt. % polypropylene staple fibers and 50 wt. % polyethylene/polypropylene sheath/core bicomponent fibers before and after calendaring.

TABLE 1

Physical Properties of Preferred Embodiment

| TAPPI* No. | Physical Property | Uncalendared | Calendared |
| --- | --- | --- | --- |
| 410 | Basis Weight (lbs./3000 ft$^2$) | 39.7 | 39 |
| 411 | Caliper (mils) | 12.7 | 7.68 |
| 251 | Frazier Air Permeability (cfm) | 311 | 94.2 |
| 403 | Mullen (psi) | 21 | — |
| 494 | Tensile (lb./in.) (MD/CD) | 4.7/3.8 | 19.8/10.6 |
| 494 | Elongation (%) (MD/CD) | 12.6/11.6 | — |
|  | Apparent Density (g/cm$^3$) | 0.13 | 0.35 |

*Standards of the Technical Association of the Pulp and Paper Industry ("TAPPI"), Technology Park, Atlanta, Georgia.

The calendared composite exhibits a microstructure in which fiber interfaces are fused due to melting of the polyethylene sheath binder fiber material. The polyethylene sheath material has a melting point lower than that of the polypropylene core material and staple fibers. The calendaring of the composite web effects a reduction in the fiber spacing, i.e., by fiber compression and bonding. The density and the flatness (levelness) of the surface of the web material are substantially enhanced in the calendaring process.

The foregoing preferred embodiments have been described for the purpose of illustration only and are not intended to limit the scope of the claims hereinafter. Variations and modifications of the composition and method of manufacture may be devised which are nevertheless within the scope and spirit of the invention as defined in the claims appended hereto. For example, it will be apparent to practitioners of ordinary skill that polyolefin binder fibers different than those specified herein may be used, so long as the polyolefin binder fiber material has a melting point lower than that of the polyolefin staple fibers and provides adequate bonding of those polyolefin staple fibers to form a nonwoven web with high tensile strength. In addition, polyolefin staple fibers of 0.2 to 3.0 denier can be used and blended in various ratios to effect desired physical properties. The range and blend of binder fibers may also be varied to effect desired physical properties. Furthermore, the physical properties as well as the performance of the sheet material can be altered to fit a particular set of physical specifications by adjusting the furnish composition and ratio as well as the calendaring parameters. The length and denier of the polyolefin fibers may be varied provided that the air permeability of the calendared sheet lies in the range of 75–200 cfm. Sheet basis weights may also vary from 60 to 85 gm/m² depending on the sheet fiber composition and the calendaring conditions chosen to effect a certain set of physical properties. In accordance with a further alternative, hot air dryers can be used instead of dryer cans to dry the wet-laid sheet before calendaring. All such variations and modifications are intended to be encompassed by the claims set forth hereinafter.

What is claimed is:

1. A nonwoven web made by a process comprising the following steps:

creating a fiber furnish having the following fiber composition: 10 to 97 wt. % of polypropylene staple fibers having a polyvinyl alcohol surface and 3 to 90 wt. % of fibers selected from the group consisting of polyvinyl alcohol fibers, polyethylene/polypropylene bicomponent fibers and polypropylene staple fibers, wherein the amount of polyvinyl alcohol fibers does not exceed 10 wt. %;

laying said fiber furnish on a papermaking machine to form a wet-laid web;

removing water from said wet-laid web; and thermal bonding said wet-laid web after said water removing step, said thermal bonding being performed at a temperature such that said polyvinyl alcohol surfaces at least partially melt without causing said polypropylene fibers to melt to form the nonwoven web having air permeability values ranging from 25 to 200 cfm.

2. The nonwoven web as defined in claim 1, wherein said polyethylene/polypropylene bicomponent fibers comprise a polyethylene sheath and a polypropylene core.

3. The nonwoven web as defined in claim 2, wherein said polyethylene/polypropylene bicomponent fibers have an average denier of about 1.5 and an average length of about ¾ inch.

4. The nonwoven web as defined in claim 1, wherein said thermal bonding is performed by calendaring with heated calendar rolls.

5. The nonwoven web as defined in claim 1, wherein said web has an air permeability in the range of 75–200 cfm.

6. The nonwoven web as defined in claim 1, wherein said water removing step is performed by drying in an infra-red dryer followed by drying on a dryer can stack.

* * * * *